(12) United States Patent
Abraham

(10) Patent No.: US 6,922,135 B2
(45) Date of Patent: *Jul. 26, 2005

(54) HIGH FREQUENCY NETWORK MULTIPLEXED COMMUNICATIONS OVER VARIOUS LINES USING MULTIPLE MODULATED CARRIER FREQUENCIES

(75) Inventor: Charles Abraham, Clarksville, MD (US)

(73) Assignee: Satius, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/848,435

(22) Filed: May 18, 2004

(65) Prior Publication Data

US 2004/0212481 A1 Oct. 28, 2004

Related U.S. Application Data

(63) Continuation of application No. PCT/US03/03045, filed on Jan. 31, 2003, which is a continuation-in-part of application No. 10/061,798, filed on Feb. 1, 2002, now Pat. No. 6,686,832, which is a continuation-in-part of application No. 09/576,981, filed on May 23, 2000, now Pat. No. 6,396,392.

(51) Int. Cl.[7] .............................................. H04M 11/04
(52) U.S. Cl. ............................ 340/310.05; 340/310.01; 340/310.02; 340/310.07
(58) Field of Search ...................... 340/310.01, 310.02, 340/310.03, 310.06, 310.07, 538, 310.05

(56) References Cited

U.S. PATENT DOCUMENTS 5,351,272 A     9/1994  Abraham
5,497,142 A  *  3/1996  Chaffanjon ............ 340/310.06
5,559,377 A  *  9/1996  Abraham ..................... 307/104
5,684,450 A  * 11/1997  Brown ................... 340/310.02
5,705,974 A  *  1/1998  Patel et al. ............ 340/310.08
5,717,685 A  *  2/1998  Abraham ............... 340/310.01
5,949,327 A  *  9/1999  Brown ................... 340/310.01
6,014,386 A     1/2000  Abraham
6,104,707 A     8/2000  Abraham
6,396,392 B1 *  5/2002  Abraham ............... 340/310.01
6,686,832 B2 *  2/2004  Abraham ............... 340/310.01

FOREIGN PATENT DOCUMENTS

JP    S56-125131    10/1981
JP    S59-114648     8/1984

* cited by examiner

*Primary Examiner*—Daryl C Pope
(74) *Attorney, Agent, or Firm*—Akin Gump Strauss Hauer & Feld, LLP

(57) ABSTRACT

An apparatus is provided for high frequency multiplexed electrical line communication for cable TV, telephone, internet, security and other control applications over the mid and low voltage power lines and directly through the transformers. The apparatus includes a transmitter, a receiver, a modem, a multiplexer and multiple couplers at each of two or more locations along an electrical line. The couplers have capacitive circuits serially connected with an air-core or dielectric-core transformer. The capacitive circuits resonate with the transformer at a preselected frequency. The coupler eliminates noise and is matched to the characteristic impedance of the line at the preselected frequency, which linearizes communication on the line and allows high speed data and voice communication over long distances. Multiple modulators and demodulators are used to produce multiple modulated carrier frequencies.

19 Claims, 13 Drawing Sheets

HIGH FREQUENCY NETWORK MULTIPLEXED COMMUNICATIONS OVER VARIOUS LINES USING MULTIPLE MODULATED CARRIER FREQUENCIES

CROSS-REFERENCE TO RELATED APPLICATIONS

This application is a continuation of PCT International Patent Application No. PCT/US03/03045 designating the United States, filed on Jan. 31, 2003 which is a continuation-in-part of U.S. application Ser. No. 10/061,798, filed Feb. 1, 2002, now U.S. Pat. No. 6,686,832, which is a continuation-in-part of U.S. application Ser. No. 09/576,981, filed May 23, 2000, now U.S. Pat. No. 6,396,392. All of the above patent applications and U.S. patents are incorporated herein by reference.

BACKGROUND OF THE INVENTION

The present invention relates generally to improved power system communications, and more particularly to apparatus capable of simultaneously transmitting and receiving multiple multiplexed digital data signals both at high rates and over long distances through power lines and power line transformers, including AC, DC, coaxial cables, and twisted pair lines.

"Power-line Carriers" are well known in the field of power system communications. The principal elements of such power-line carriers are transmitting and receiving terminals, which include one or more line traps, one or more coupling capacitors, and tuning and coupling equipment. Detailed information regarding the description and typical composition of conventional power-line carriers may be found in Fundamentals Handbook of Electrical and Computer Engineering Volume II: Communication Control Devices and Systems, John Wiley & Sons, 1983, pp 617–627, the contents of which are incorporated herein by reference. A significant problem associated with prior art power-line carriers is their requirement for one or more line traps, one or more capacitors, one or more coupling transformers or carrier frequency hybrid circuits and frequency connection cables.

All traditional couplers incorporate a ferrite or iron core transformer which causes signal distortion due to the non-linear phase characteristic of the transfer function between the transmit coupler and the receive coupler. The distortion is created by the presence of magnetic core material which exhibits hysteresis. For distribution power-line carriers, the distortion is particularly severe because the signal must propagate through at least three such non-linear devices, the distribution transformer and two power-line couplers, that use ferrite core transformers. The distortion caused by these non-linear devices leads to envelope delay distortion, which limits communication speeds.

The major shortcoming of previous designs resulted from the use of ferrite or iron core transformers in the signal couplers. The primary winding inductance, L1, is altered to some unknown value due to the non-linearity of the core. This results in a mistuning of the desired carrier frequency. Also, the impedance of the primary winding at the desired carrier frequency is no longer matching the power line characteristic impedance. In recognition of this fact, other designs attempt to merely couple a signal onto a power line with a low transceiver input impedance by using a large coupling capacitor (approx. 0.5 uF). This results in a significant coupling loss of up to 20 dB at the carrier frequency.

U.S. Pat. No. 6,407,987 (Abraham) discloses a novel phase shift linear power, phone, twisted pair, and coaxial line coupler for both transmission and reception. The phase shift linear coupler comprises a novel air-core or dielectric core transformer which can be used for phone line, coaxial, LAN and power line communication through power line transformers. The phase shift linear coupler further comprises an associated coupling capacitor network in order to achieve resistive matching to approximately the lowest known value of the line characteristic impedance and to maximize stable signal transmission onto the line. This resonance effectively creates a band pass filter at carrier frequency. U.S. Pat. No. 6,407,987 is incorporated herein by reference in its entirety.

The designs described in U.S. Pat. No. 6,407,987 solved many of the problems of previous designs, which used ferrite or iron couplers that resonated with the power line characteristic impedance, resulting in notches, suck outs and non-linear media for communications over various lines such as power lines. The phase shift linear coupler in U.S. Pat. No. 6,407,987 does not have notches at the communications bandwidth, allowing linear communication over a very wide range of frequencies.

There is still a need, however, for a power line communications system capable of simultaneously transmitting and receiving multiple digital data signals using higher frequencies (e.g., 200 Mhz–500 GHz), thereby permitting communication at high rates using wide bandwidths and over long distances through power lines and power line transformers, including AC, DC, coaxial cables, and twisted pair lines.

BRIEF SUMMARY OF THE INVENTION

Briefly stated, in a first embodiment, the present invention is a communications apparatus for communicating multiple electrical signals through one or more electrical lines having a characteristic impedance. The communications apparatus comprises:

a modulator which modulates the electrical signals to produce a modulated carrier signal having a preselected frequency equal to about 200 MHz or greater;

a transmitter electrically connected to the modulator and having an output impedance, the transmitter transmitting the modulated carrier signal; and a coupler connected between the electrical line and the transmitter, the coupler matching the output impedance of the transmitter means to the characteristic impedance of the electrical line and communicating the modulated carrier signals to the electrical line without substantial phase distortion.

In a second embodiment, the present invention is a communications apparatus for communicating electric signals through one or more electric lines having a characteristic impedance comprising:

a modulator which modulates the electric signals to produce a modulated carrier signal having a first preselected frequency equal to about 200 Mhz or greater;

a transmitter electrically connected to the modulator and having an output impedance, said transmitter transmitting the modulated carrier signal;

a first coupler connected between the electric line and the transmitter, said coupler matching the output impedance of the transmitter to the characteristic impedance of the electric line and communicating the modulated carrier signal to the electric line without substantial phase distortion;

a receiver having an input impedance, said receiver receiving the modulated carrier signal;

a demodulator electrically connected to the receiver, said demodulator producing a demodulated carrier signal having a second preselected frequency equal to about 200 Mhz or greater by demodulating the modulated carrier signal; and a second coupler connected between the electric line and the receiver for matching the input impedance of the receiver to the characteristic impedance of the electric line and communicating the modulated carrier signal to the receiver without significant phase distortion.

In a third embodiment, the present invention is a communications apparatus for communicating electric signals through one or more electric lines having a characteristic impedance comprising:

a first modem which produces a first modulated carrier signal having a first preselected frequency equal to about 200 MHz or greater and demodulates a second modulated carrier signal having a second preselected frequency equal to about 200 MHz or greater;

a first transmitter having an output impedance, said transmitter connected to the first modem and transmitting the first modulated carrier signal;

a first receiver having an input impedance, said receiver connected to the first modem and receiving the second modulated carrier signal;

a first coupler connected between the electric lines and the first transmitter and the first receiver, said first coupler matching the output impedance of the first transmitter and the input impedance of the first receiver to the characteristic impedance of the electric lines and communicating the first and second modulated carrier signals without substantial phase distortion;

a second modem which produces the second modulated carrier signal and demodulates the first modulated carrier signal;

a second transmitter having an output impedance, said transmitter connected to the second modem and transmitting the second modulated carrier signal;

a second receiver having an input impedance, said receiver connected to the second modem and receiving the first modulated carrier signal; and a second coupler connected between the electric lines and the second transmitter and the second receiver, said second coupler matching the output impedance of the second transmitter and the input impedance of the second receiver to the characteristic impedance of the electric lines and communicating the first and second modulated carrier signals without substantial phase distortion.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

The present invention presents improvements to the phase shift linear coupler in U.S. Pat. No. 6,407,987. It has been discovered that using higher frequencies (1–500 GHz) with an air-core or dielectric core coupler produces better results because it has wider bandwidth and can transmit for further distances. The higher frequency signals will create a magnetic field around any type of wire and will travel along the surface of a power line like a magnetic wave and jump transformers. Therefore the transmission of such high frequency signals can be achieved for long distances with wide bandwidth.

In a controlled environment like a coax cable, a high frequency signal of 1 GHz or more will travel only a short distance before it will disappear. This is because a coax cable has a high fixed serial inductance L and a parallel capacitance C which result in a strong low pass filter that can eliminate signals of every frequency at a certain distance. Also, a coax cable can only create a small magnetic field around the middle conductor because it is closely shielded.

A different environment is presented by power lines, which do not simply go from one point to another, but rather are in a star configuration. Power lines do not have fixed L and C values and therefore the power line is a weaker low pass filter than the coax cable. Power lines are also not shielded, and therefore the power line conductor can create a larger magnetic field around the wire than in a coax cable. Additionally, the characteristic impedance Zo of the power lines changes in time and in location and the number of wires connected to each other also varies at various points in the power distribution network. Accordingly, the propagation of electric/magnetic fields from digital signals down the power lines will not be eliminated and such signals can travel further than in the coax cable. High frequency signals can also jump power line transformers, which look like a big parallel capacitor to the signal, without much loss of signal strength if matching to the power line according to the present invention as described herein is used.

The importance of the coupler of the present invention is that it can remain a matching device to the power line characteristic impedance. As in U.S. Pat. No. 6,396,392, the coupler of the present invention comprises an air-core or dielectric-core transformer and a coupling capacitor, Ceq. Any impedance change on the primary winding of the transformer does not reflect much to the secondary winding of the transformer and vice versa. Therefore, the only impedance that will be seen by the power line is the primary winding resonated with the capacitor Ceq. Such serial resonance will create a low impedance, which will be close to 1 ohm. As the frequency is increased, the impedance will increase also to approximately 100–200 ohms, depending on which impedance is the best to match the power line characteristic impedance, and how much bandwidth is needed.

Figure 1:
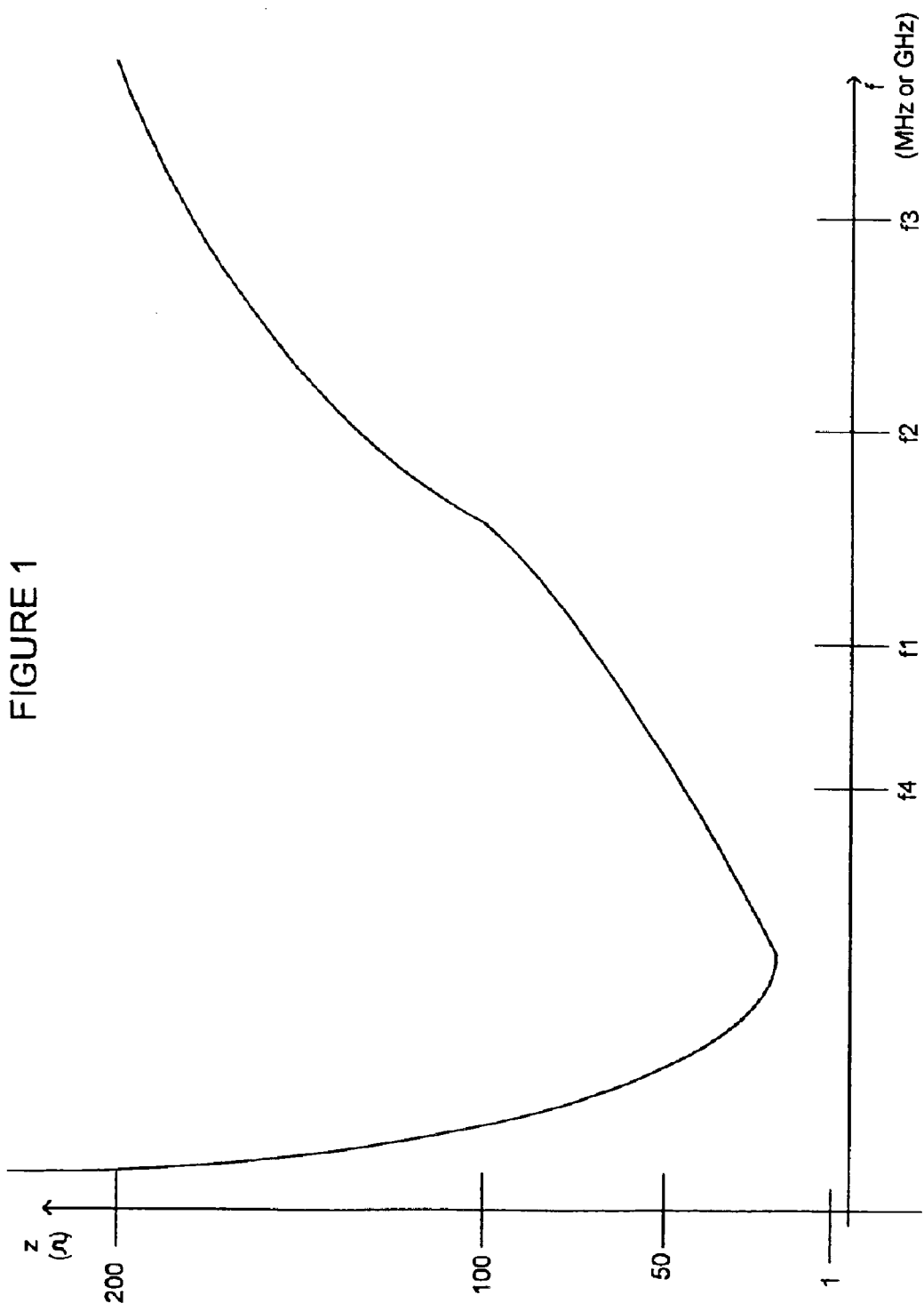
FIG. 1 is a graphical illustration of the characteristic impedance to the power line of the coupler of the present invention.

For example, FIG. 1 shows the coupler characteristic impedance to the power line. If the power line impedance is 100 ohms at F1 then 6 dB matching from the coupler will be from 40 ohms to 50 ohms (F4) to 200 ohms(F3), which will cover a wide bandwidth from F3 to F4. By contrast, if the power line characteristic impedance is only 10 ohms, the 6 dB matching will be from 5 to 20 ohms, resulting in a smaller bandwidth. Lowering the coupler impedance can result in wider bandwidth matching in low characteristic impedance (e.g., 10 ohms) power lines.

As discussed in U.S. Pat. No. 6,396,392, a significant advantage of the coupler of the present invention is the phase linearity achieved. Power lines have local impedances every couple of feet at different frequencies. The best matching to the power line can be achieved by using inductor (L) and capacitor (C) components that do not include ferrite and iron cores because the power line consists of L's and C's. Moreover, reflections occur at the end of each unterminated line. Ferrite or iron core couplers also have self resonances around the communications bandwidth of interest. The self resonance and the reflection in the power lines create variable bandwidth notches. By contrast, the air-core or dielectric-core coupler of the present invention self resonance is at a much higher frequency then the frequency band of interest, and the air-core coupler matches the local characteristic impedance of the power line. Therefore, reflections do not create notches at the frequency band of interest.

6 to 10 dB flatness of bandwidth is achieved by using the coupler of the present invention to match to the power line. This matching can be achieved when the power line characteristic impedance is between the range of half of the coupler primary impedance and twice the coupler primary impedance. For example, the primary impedance of the coupler will range from 1 to 100 ohms for the frequency band 18–30 MHz. Assuming that the power line impedance is 50 ohms at 22 MHz and 10 ohms at 20 MHz, around 20 MHz we will have a matching from 25 to 100 ohms which will cover frequencies between approximately 21 to 30 MHz. Assuming that the coupler primary impedance at 20 MHz is about 20 ohms, matching will be achieved from 18 to about 22 MHz. The total matching will be from 18 to 30 MHz of 10 dB bandwidth, and there will be no notch.

Power lines have a typical impedance of 50 to 100 ohms for underground lines and 100 to 500 ohms for overhead lines. However, circuit breakers and underground substations with lots of feeders may create as low as a 1 ohm power line characteristic impedance at their location. The coupler is designed to accommodate the most common local impedance of the power line. For example, if the power line characteristic impedance is 80 ohms, then 6 dB matching can be achieved with the air-core coupler of the present invention from 40 to 160 ohms at any location. The power line must be matched locally because the local impedance of the power line changes every few feet. Since the 120V power line characteristic impedance is known to be, for example 80 ohms, therefore 80 ohms will be a good match at any 120V location.

Since the secondary impedance is not changed significantly by the change of the power line characteristic impedance, transmitter and receiver matching can be achieved at around 50 ohms. Both sides of the transformer are matched regardless of the change of impedance on the power line. The secondary of the transformer is matched by the transmitter or receiver. The impedance change on the primary of the transformer does not reflect to the secondary. Therefore, 45–50 ohms matching is achieved all of the time to the transmitter and the receiver regardless of the impedance changes in the power lines.

For higher frequencies (e.g., 200 Mhz–500 GHz), the structure of the air-core or dielectric core transformer differs from that described in U.S. Pat. No. 6,396,392. The coupler may no longer be two coaxial solenoids or air-coils of different diameter wrapped with magnet wire, but instead is much smaller and resembles a chip which is filled with any type of plastic or non-conductive material, such as resin, glue material, ceramic or any other hard non-conductive material ("chip material"). The coupler preferably comprises very thin conductive plates separated by chip material. The plates are preferably made from copper, but can also be made from silver, gold, or any other conductive material, whether it is active or passive. The plates can be any shape (e.g., square, rectangular, round, etc.) but are preferably circular. The size of such layered air-core transformers will depend on the frequency of usage. For example, a 30 GHz coupler primary diameter will be less then 1 millimeter, the layer thickness will be less then about 0.1 millimeter, which results in about a 0.3 nH inductance. Similarly, the thin rectangular copper plate sizes will be around a couple of millimeters long, 0.1 millimeters thick and the primary and secondary inductors will be about 0.5 millimeters away from each other, on top of each other. Consequently, such devices will look like a very small capacitor. However, the present invention uses the end to end inductor values to resonate the capacitor for matching the power line characteristic impedance.

Alternatively, the plates can be formed directly in a chip by deposition of metallic layers or through doping silicon. Doped silicon is conductive when it is active—e.g., a DC level of voltage turns on a transistor to make it an active device. Thus, the plates when formed of doped silicon may take the form of some type of active device such as a transistor or a diode. Of course, it will be appreciated that other designs of air-core or dielectric-core transformers can be used without departing from the spirit or scope of the present invention. For example, a piece of coax cable can be used as an air-core transformer. The shield of the coax cable is the primary of the transformer and the inside wire is the secondary of the transformer. This coax type of air-core transformer can be used for very high frequency communications above 500 MHz. Similarly two copper or iron pipe-like cylinders (or aluminum or copper foil) can be placed inside each other. The outside cylinder or foil is the primary of the air-core transformer, and the inner cylinder or foil is the secondary. This design can also be used over 100 MHz.

Moreover, recent work has been done in creating solid-state transformers for the conversion of mid-voltage AC on the order of 7.6 kV to 120 VAC using technology similar to that used in switching regulators for DC to DC conversion. The technology used in these solid-state transformers is called the Gate Drive Control of Transistors Gate drive circuits and is well known, and need not be described in detail herein. These transformers are designed with so-called "solid state" technology—namely, they rely primarily on semiconductor components such as transistors and integrated circuits instead of the heavy copper coils and iron cores of conventional transformers. Such solid-state transformers can also be used in the couplers of the present invention. One of ordinary skill in the art will also appreciate that other more simple integrated circuits can also be used to create transformers for use in the coupler of the present invention. Today's integrated circuits using active transistors can simulate and/or create an air-core transformer that can have the necessary inductance and capacitance values to work exactly as a regular air-core transformer.

Although the structure of the coupler as described above differs from that disclosed in U.S. Pat. No. 6,396,392, the function of the coupler is the same. The plates (or cylinders or foils) of the coupler of the present invention are inductively and capacitively coupled creating an air-core or dielectric-core transformer. The coupling of the primary and secondary of the transformer varies with frequency, however. The primary and secondary are coupled about equally magnetically and electrically (i.e., capacitively and inductively coupled) below 100 MHz of frequency and more inductively coupled (magnetically) at frequencies higher than 100 MHz. At frequencies on the order of 100 GHz, the primary and secondary of the transformer will be mostly inductively coupled.

As described in detail in U.S. Pat. No. 6,396,392, the communications apparatus of U.S. Pat. No. 6,396,392 has numerous applications. The high frequency couplers of the present invention extend this functionality by allowing much higher data transmission rates. For example, the present invention can use high frequency carriers on the order of 200 Mhz–50 GHz for transmission over the power lines. Using the air-core or dielectric-core coupler technology of the present invention, up to at least 1 Gbps of communication speed can be achieved over the power lines.

Figure 2:
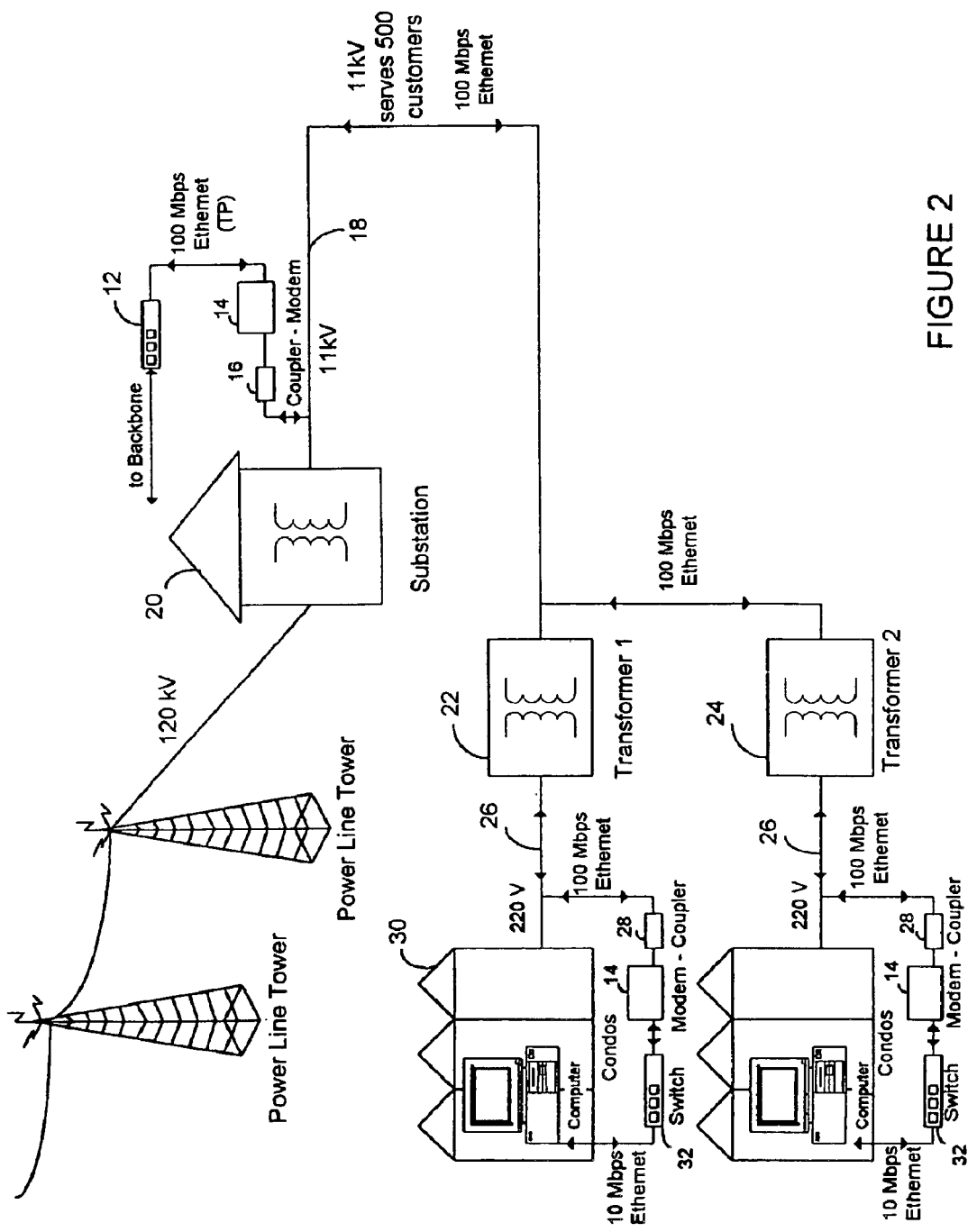
FIG. 2 is a schematic block diagram of a power-line communication wide area network according to the present invention.

Referring now to the drawings, wherein like numerals designate like or corresponding parts throughout each of the several views, there is shown in FIG. 2 a block diagram of a power-line communication wide area network (WAN) according to the present invention.

An Ethernet router 12 is connected to a network backbone, such as the Internet or an Intranet using a HUB or switch (not shown) like the Network Peripheral's NuWave 3 layer line of products. The router 12 is also connected to a power line modem 14, which in turn is connected to a mid voltage power line coupler 16, which couples the signals from the modem 14 onto the 11KV power line 18 at a substation 20.

Those of skill in the art will appreciate that the Ethernet router 12 could be connected to other devices in other applications without departing from the spirit or scope of the present invention. For example, other applications include (1) Ethernet wide area networks with other servers where the backbone is connected to another network; (2) telephone service applications where the backbone is connected to a telephone center and to a time division multiplexer that will establish multiple telephone lines over the power line; and (3) television applications where the backbone is connected to a TV broadcasting station that will digitally transmit several TV stations over the power line.

The Ethernet router 12 is a standard Ethernet router. The power line modem 14, through the mid voltage power line coupler 16, modulates and demodulates the Ethernet signals onto the 11KV power line 18. The design of the power line modem 14 is discussed in detail below. The mid voltage power line coupler 16 is preferably about 0.5 meters high and 0.2 meters in diameter, placed in a ceramic insulator and stuffed with resin. A dielectric-core transformer is preferably used for the coupler, which, as explained above, can take the form of two small pieces of plate laid capacitively on top of each other for high frequency operation. Of course, any of the other high frequency transformer designs discussed above could also be used in the mid voltage power line coupler 16 without departing from the spirit or scope of the present invention.

The high frequency signal, preferably a 100 Mbps or greater Ethernet signal, propagates over power lines 18 and through one or more distribution transformers 22, 24 by magnetic waves and onto the 110–220V low voltage power lines 26. The signal is picked up by one or more power line modems 14 through low voltage couplers 28. The low voltage couplers 28 and the power line modems 14 are preferably placed on the low voltage power lines 26 before the power meters (not shown) going into buildings 30. The power line modems 14 are identical to the power line modems 14 coupled to the power lines 18. The low voltage couplers 28 can be designed as described in U.S. Pat. No. 6,396,392, and are smaller than the mid voltage power line coupler 16. The low voltage couplers 28 use high frequency air-core or dielectric-core transformers as described above.

Ethernet switches (HUBs) 32 are coupled to the power line modems 14. The Ethernet switches 32 distribute the Ethernet data over the power lines into buildings 30 using a power-line communication local area network (LAN) according to the present invention as described below.

The power line modems 14 preferably all use a 1.35 GHz frequency for both transmission and reception. This carrier frequency will communicate over the distribution transformers 22, 24 from the mid voltage power lines 18 (7 to 35 KV) to the low voltage power lines 26 (110 to 240 V) to the buildings 30. 100 Mpbs or 10 Mbps Ethernet data can be transmitted using this carrier frequency. Those of skill in the art will appreciate that other carrier frequencies, such as 2.7 GHz or 3.5 GHz can be used without departing from the spirit or scope of the present invention. Thus the system an communicate carrier frequency signals through distribution transformers at greater than 100 Mbps at carrier frequencies of 200 MHz or higher. The carrier frequency can be carried on low voltage (e.g. 120 volt), mid voltage (e.g. 3–35 Kv) or high voltage (e.g. 69–750 KV) power lines.

In an alternate embodiment, a carrier frequency of 30 GHz or more can be used to transmit Ethernet data of 10 Mbp, 100 Mbps, 1 Gbps or more. When a carrier frequency of this magnitude is used, the power-line communication wide area network (WAN) of the present invention is able to communicate all the way from the substation 20 into the buildings 30 without the need of stopping at the power meters outside the buildings 30. Therefore, the power line modems 14 and low voltage couplers 28 do not need to be placed on the low voltage power lines 26 before the power meters (not shown) going into buildings 30. Rather, the power line modems 14 and low voltage couplers 28 can be placed inside of the buildings 30.

Those of skill in the art will also understand that although the present embodiments are described using the Ethernet protocol to transmit and receive data, any other data protocol can be used with the power-line communication wide area network (WAN) of the present invention without departing from the spirit or scope of the present invention.

Figure 3:
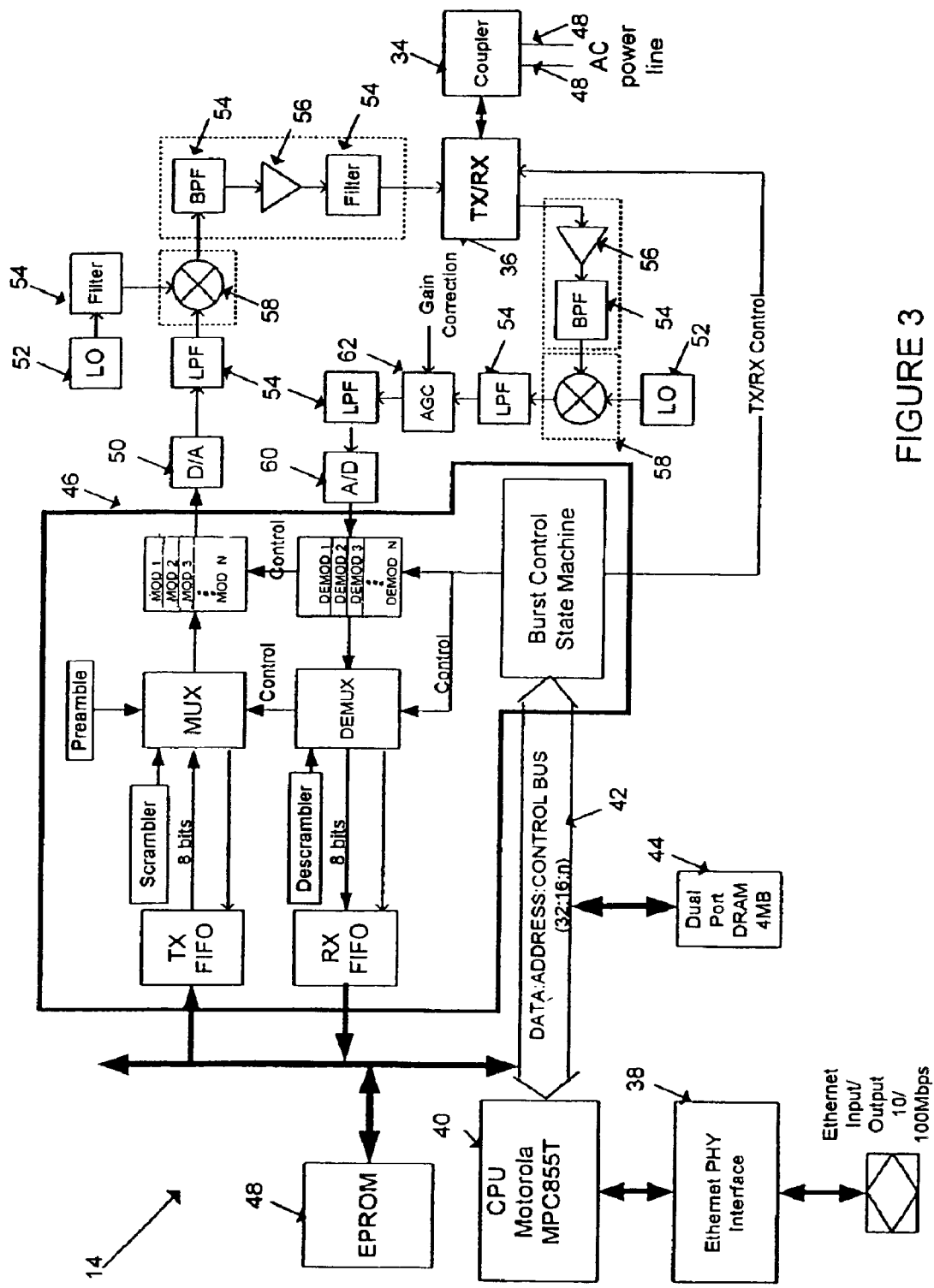
FIG. 3 is a schematic diagram of a half-duplex power line modem according to the present invention.

Referring now to FIG. 3, a presently preferred configuration for the power line modem 14 is shown. Physical Ethernet interface 38 connects the power line modem 14 to an Ethernet card or HUB or repeater (not shown), and can comprise any appropriate connection including a twisted pair connection. Ethernet data (e.g., Manchester coded data) is provided from the interface 38 to CPU 40, such as a Motorola MPC855T, which converts the coded data to and from the parallel bus interface 42. Memory 44 is used to buffer the data on the parallel bus interface 42.

A Field Programmable Gate Array (FPGA) 46, preferably an Altera Stratics 25 or a Xilinx Virtex XCV100-FG256, connects to the parallel bus interface 42 and provides control for the power line modem 14 as well as performing the multiple modulation and demodulation of data that is transmitted and received, respectively. EPROM 48 stores program instructions for FPGA 46 and the CPU 40. The FPGA 46 controls transmit/receive switch 36, which is connected to coupler 34 and the power lines 48 over which the data from power line modem 14 is carried. The interface of coupler 34 to the power lines 48 as well as the structure of coupler 34 are explained in detail in U.S. Pat. No. 6,396,392. As noted above, however, a high frequency air-core or dielectric-core transformer of the present invention must be used in the coupler 34.

Circuitry is provided to interface signals to and from the FPGA 46. For transmission, a signal leaves the FPGA 46 and passes through analog to digital (A/D) converter 50. Up conversion to the carrier frequency is performed by mixer 58 and local oscillator 52. Amplifier 56 and filters 54 are used to interface the resulting signal with the coupler 34. Similarly, for reception, a signal passes through filters 54 and amplifiers 56, and is down converted by mixer 58 and local oscillator 58. Automatic gain control (AGC) is performed by AGC circuit 62, and then the signal is digitized by analog to digital (A/D) converter 60 for transmission to the FPGA 46. The power line modem of FIG. 3 is a half-duplex modem, so the carrier frequency used for transmission and reception is the same. Those of skill in the art will recognize that the AGC and mixer up/down conversion can be performed by the FPGA without the need of additional circuitry.

The filters 54 may be SAW or LC hardware filters or alternatively Fast Fourier Transfer (FFT) filters which can be programmed into the FPGA 46. The BPF (band pass filter) may be a SAW filter as well as the LPF's (Low pass filters) 54.

The FPGA 46 can be programmed to use any type of modulation desired. The FPGA 46 could be programmed to use FM, FSK, BPSK, QPSK, 16QAM, 32QAM, 64QAM, 128QAM, CDMA, ADSL, FDM, orthogonal frequency division multiplexed (OFDM) or any other type of modulation without departing from the spirit or scope of the present invention. For example, instead of using one modulated carrier frequency for transmission with a bandwidth of 30 MHz where the white noise will be high, OFDM may be used with 1000 modulated carrier frequencies or more equally spaced between each other at 30 KHz each. The white noise at 30KHz bandwidth would be approximately 20–30 dB less then at 30 MHz. FFT's are used to separate each 30 KHz modulated carrier frequency channel, which can be programmed into a DSP or FPGA. Each successfully demodulated carrier frequency can then be multiplied together to increase the actual throughput rate. The advantage of the OFDM is that due to the lower noise level, signal transmission can be achieved for longer distances. In the case of a specific frequency RF interference, only some of the OFDM channels would not succeed in demodulation, whereas the rest would still work.

Furthermore, higher modulation algorithm and coding can be used adaptively by determining the Signal to noise ratio (SNR) with one of the carrier frequency. For example QPSK modulation technique needs about 10 dB SNR and 128QAM needs about 35 dB SNR. If the demodulator has 35 dB SNR, then it can tell the modulator to use 128 QAM, which can increase the actual speed by the factor of 4. On the other hand, if the SNR is less then 10 dB, which need it for the QPSK modulation technique, adaptive coding can be used to repeat the same information multiple times and adding the SNR together to achieve the 10 dB SNR and the correct reception. Of course in that case the actual speed would decrease by the factor of the repeat factor.

It will also be appreciated that the particular model of the FPGA 46 or CPU 40 can be changed without departing from the present invention. In fact, the FPGA 46 can be replaced by other types of DSP processors as discussed in U.S. Pat. No. 6,396,392.

Instead of one modulated carrier frequency, multiple modulated carrier frequencies can be used. This is accomplished by adding multiple modulators and demodulators coupled into the programmable FPGA 46 using FFT filters to thereby create either a frequency division multiplexed (FDM) or orthogonal frequency division multiplexed (OFDM) system. This is accomplished by programming the FPGA device 46. Device 46, which as indicated, has both multiplexing and demultiplexing capability. It is a straightforward matter to program device 46 to be responsive to multiple modulators. The advantage is that the noise level is lower over a narrow bandwidth for each of several modulated signals and the usage of FMD (Frequency Division Multiplexing) or OFDM can further increase the transmission speed and distance over the power line.

Figure 4:
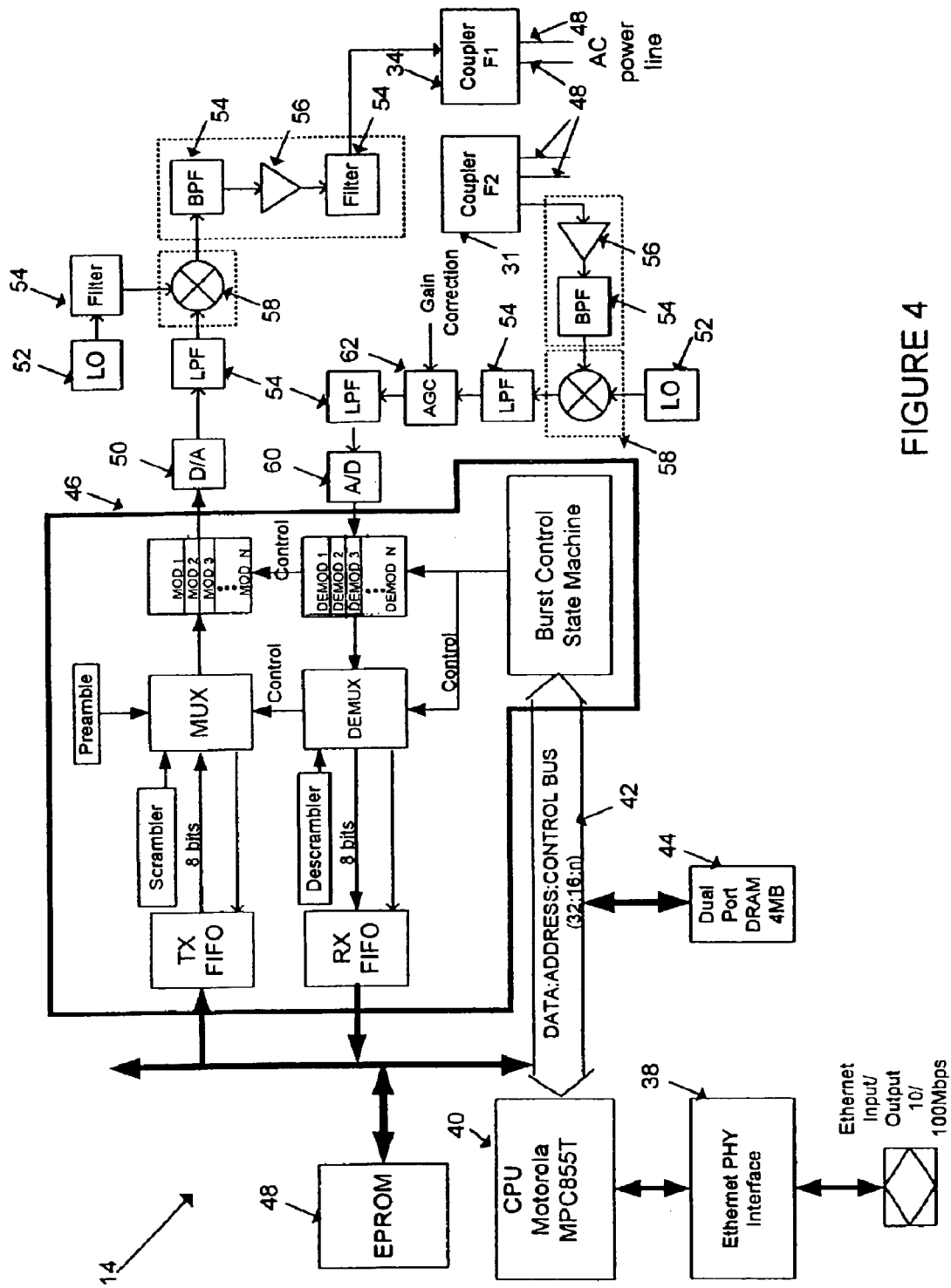
FIG. 4 is a schematic diagram of a full-duplex power line modem according to the present invention.

FIG. 4 shows a full-duplex implementation of a power line modem 14. The structure of the modem 14 is almost identical to the half-duplex modem 14 as shown in FIG. 3, with the exception of the interface between the modem 14 and the power lines 48. As seen in FIG. 4, the transmit/receive switch 36 has been removed. Instead, one coupler 34 operating at a first frequency F1 is used for transmission, and a second coupler 34 operating at a second frequency F2 is used for reception. For example, 1.2 and 1.6 GHz frequencies could be used to simultaneously transmit and receive over the power lines 48. In addition to the structural difference in the modem 14, the software program stored in EPROM 48 for the FPGA 46 would also need to be changed to reflect full duplex operation at two different frequencies.

The full duplex system shown in FIG. 4 can be programmed to use multiple modulators and demodulators as described in respect to FIG. 3.

Figure 5:
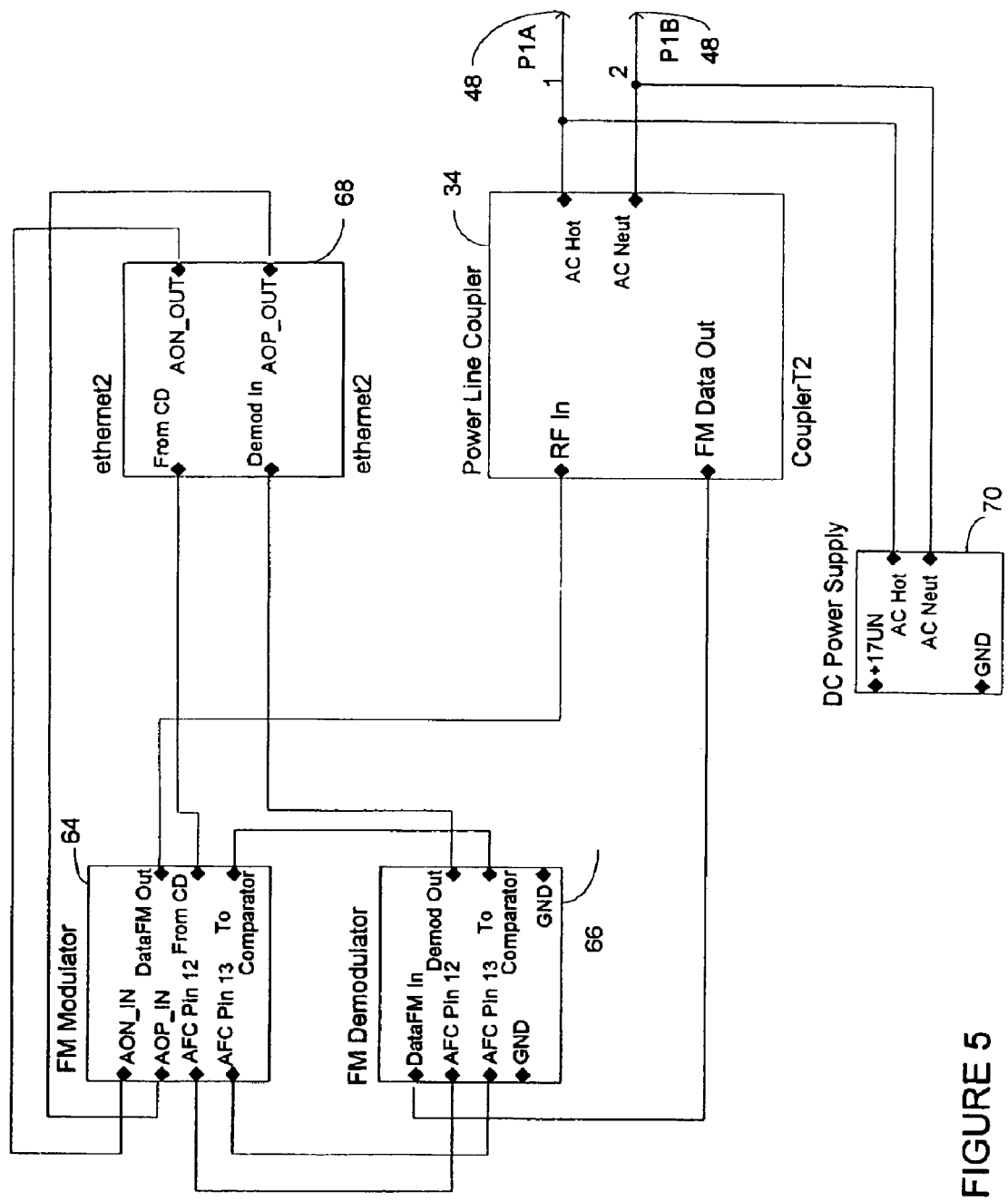
FIG. 5 is a schematic block diagram of a power line communications apparatus in accordance with the present invention.

Turning now to FIG. 5, there is shown a block diagram of a power-line communications apparatus 10 according to the present invention for use in a power-line communication local area network (LAN). The communications apparatus 10 shown is coupled to a pair of power-lines 48. The communications apparatus 10 generally comprises a modulator 64, a demodulator 66, an Ethernet interface 68, a coupler 34 and a power supply 70. The communications apparatus 10 connects to an Ethernet card, HUB or switch (not shown) and sends Ethernet data over the power lines 48 in full duplex.

In operation, a first communications apparatus 10, designated the Master unit, is coupled to power lines 48 and transmits at a first frequency F1 and receives at a second frequency F2. A second communications apparatus 10, designated the Slave unit, is also coupled to power lines 48 and transmits at the second frequency F2 and receives at the first frequency F1. For purposes of example only, the apparatus described below uses 250 MHz for F1 and 350 MHz for F2 to provide a 10 Mbps Ethernet signal over the power lines. It will of course be appreciated by those of skill in the art that other frequencies could be used without departing from the spirit or scope of the present invention. For example, frequencies in the 2.44 GHz and 5.8 GHz bands, which are license free frequency bands for communications, could be used to provide a 100 Mbps Ethernet signal over the power lines.

Figure 6:
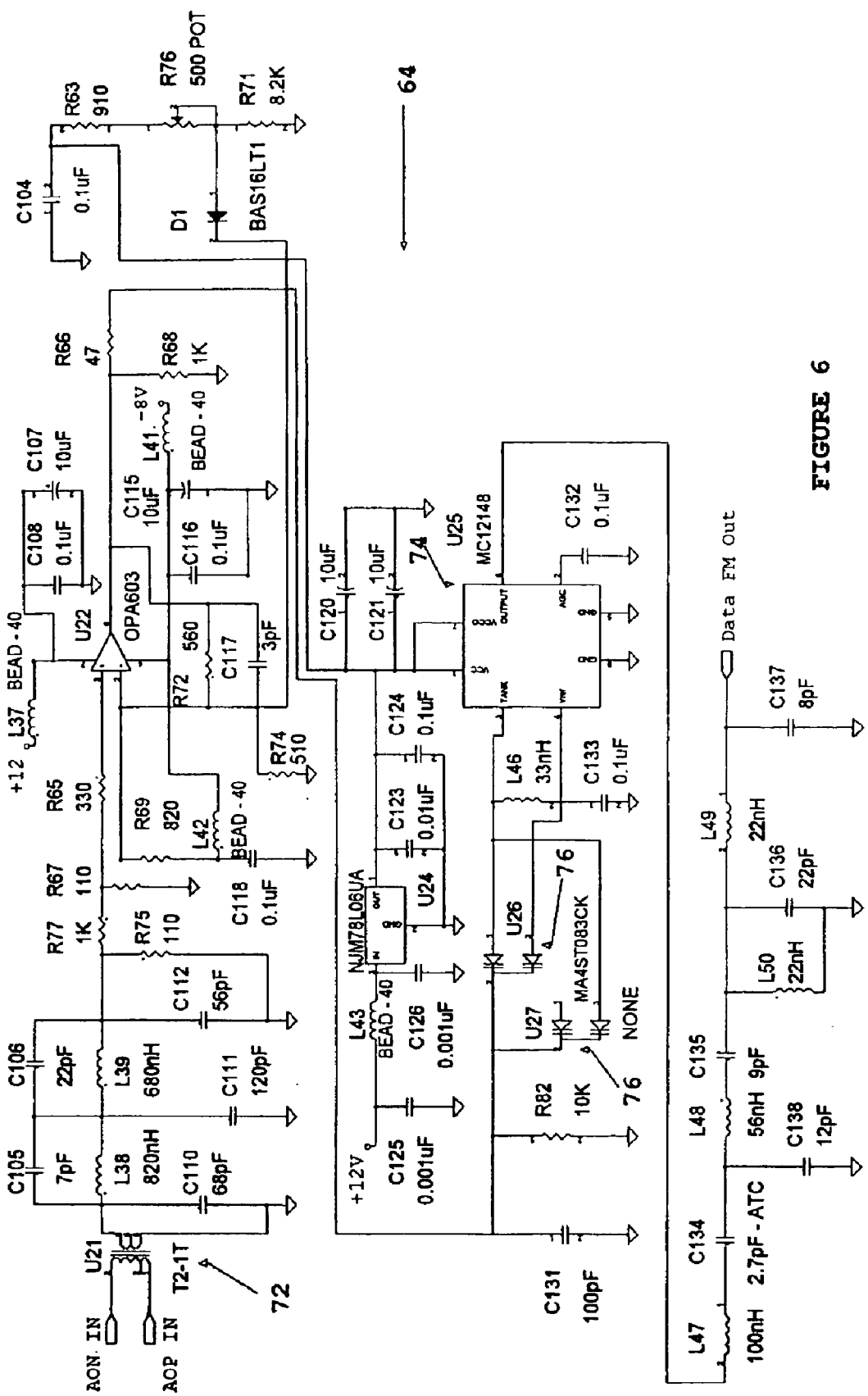
FIG. 6 is a schematic diagram of a modulator at a first frequency for use in the power line communications apparatus of FIG. 5.

Details of the modulator 64 for the Master unit (e.g., transmission at 250 MHz) are shown in FIG. 6. The modulator 64 is preferably an FM modulator comprising an oscillator 76, modulator 74 and associated capacitors and inductors connected as shown. The modulator 64 also includes RF transformer 72 and associated circuitry as shown to interface from the Attachment Unit Interface (AUI) port of the Ethernet interface 68. The Ethernet input signal is conveyed from the transformer through the oscillator/modulator circuitry 74, 76 and then through an LC filter circuit for output of the modulated signal. The values of the capacitors and inductors are chosen based on the carrier frequency, which in the case of the Master unit is 250 MHz.

Figure 7:
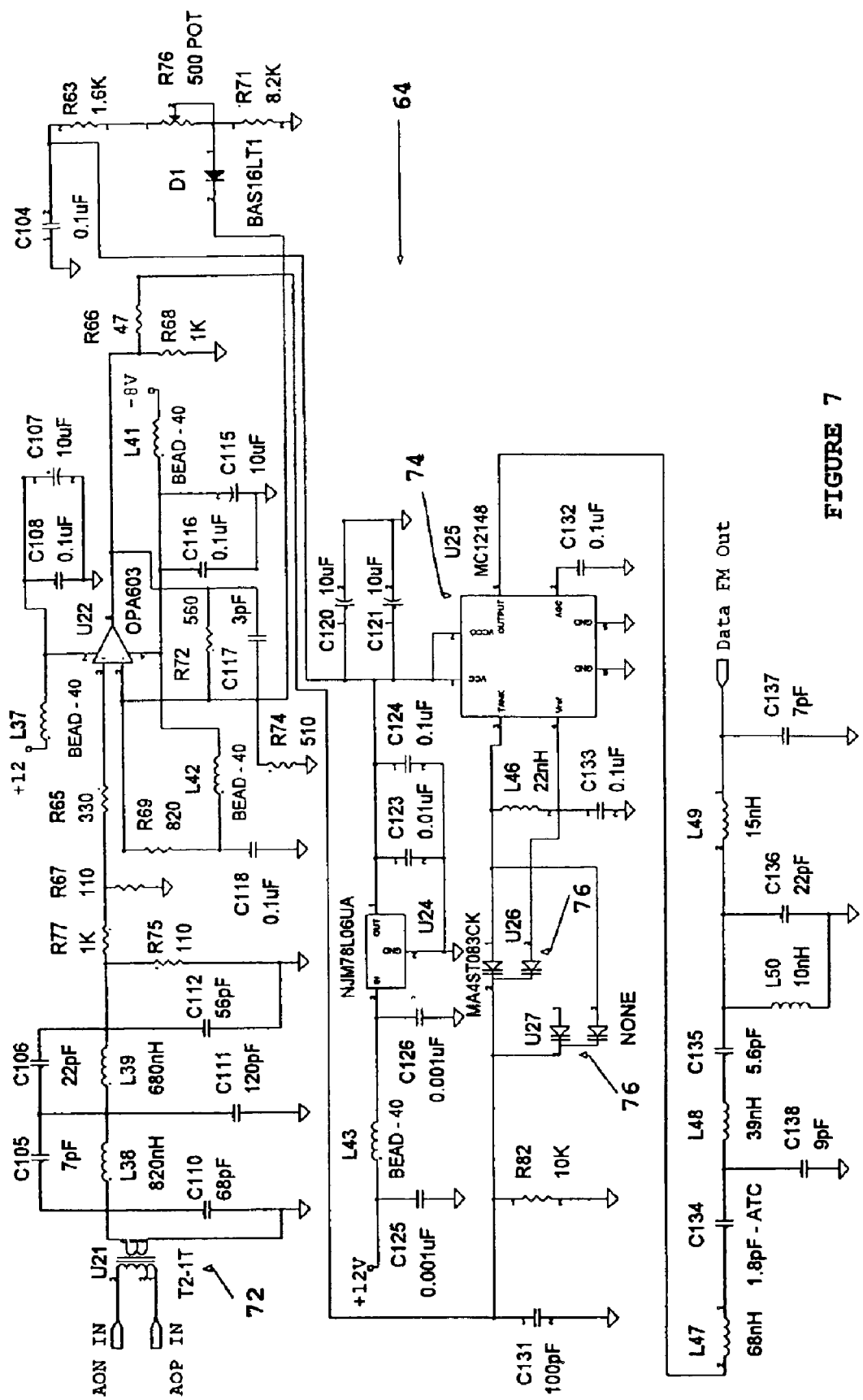
FIG. 7 is a schematic diagram of a modulator at a second frequency for use in the power line communications apparatus of FIG. 5.

FIG. 7 shows the modulator 64 for the Slave unit (e.g., transmission at 350 MHz). The Slave modulator 64 is identical to the Master modulator 64 except for the values of the inductors and capacitors in the LC filter circuit. The values of the inductors and capacitors in the Slave modulator 64 are chosen based on the 350 MHz carrier frequency.

Figure 8:
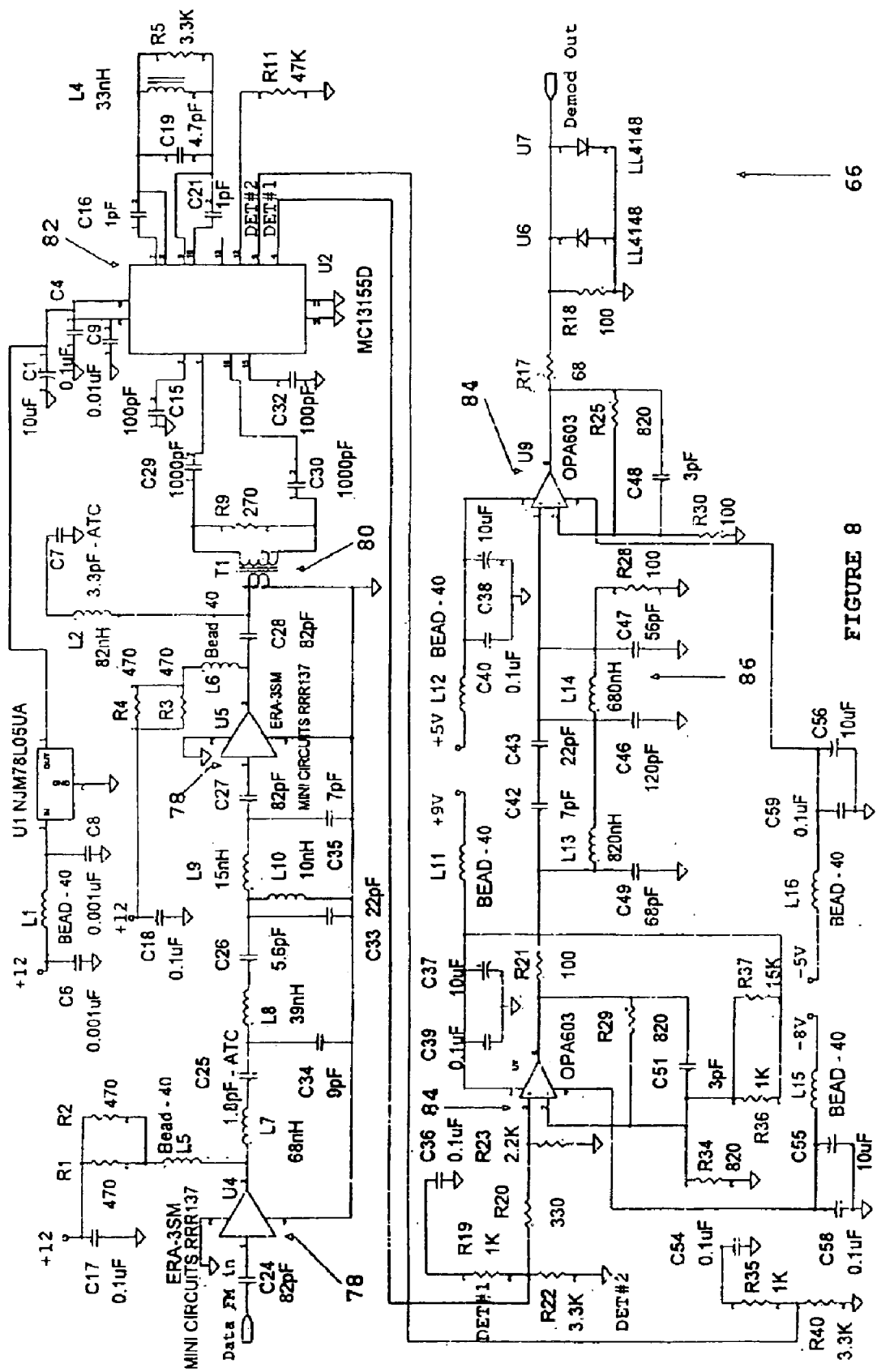
FIG. 8 is a schematic diagram of a demodulator at a first frequency for use in the power line communications apparatus of FIG. 5.

Details of the demodulator 66 for the Master unit (e.g., reception at 350 MHz) are shown in FIG. 8. The FM modulated input signal is first sent through two RF amplifiers 78 and associated circuitry as shown between the amplifiers 78 comprising Blinch filters in order to separate the noise and the other carrier frequency from the modulated input signal. The LC values in the Blinch filters are chosen based on the carrier frequencies used in the communications apparatus 10. The filtered, modulated signal is then coupled into FM detector circuit 82 through RF transformer 80. The FM detector circuit 82 is preferably an MC13155D. The output of the FM detector circuit 82 is then passed through fast amplifiers 84 and filters 86 to generate an output signal of the recovered Ethernet data from the modulated input signal.

Figure 9:
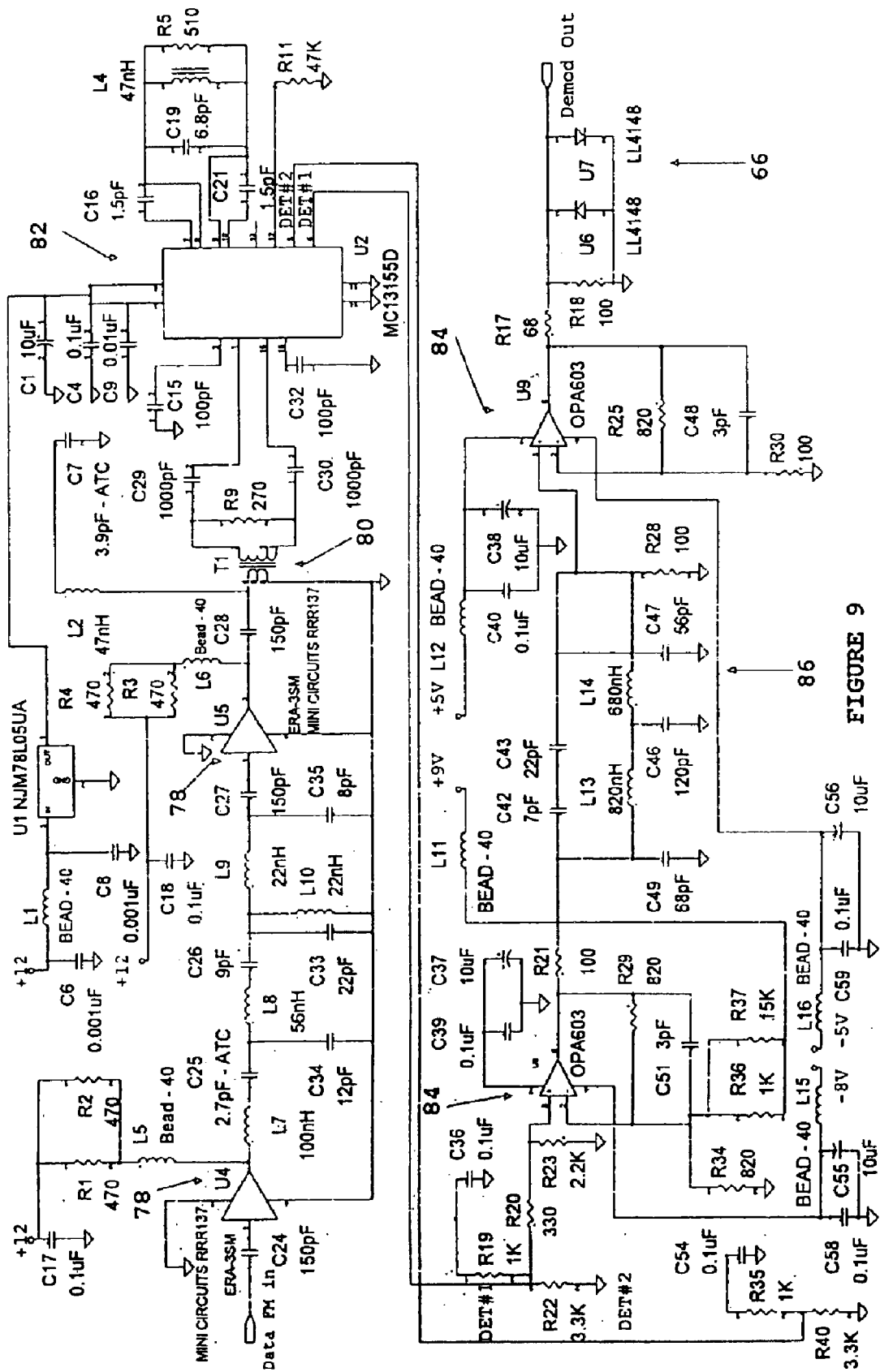
FIG. 9 is a schematic diagram of a demodulator at a second frequency for use in the power line communications apparatus of FIG. 5.

FIG. 9 shows the demodulator 66 for the Slave unit (e.g., reception at 250 MHz). The Slave demodulator 66 is identical to the Master demodulator 66 except for the values of the inductors and capacitors in Blinch filters used on the modulated input signal. The values of the inductors and capacitors in the Slave demodulator 66 are different because of the different carrier frequency that is being filtered out of the modulated input signal.

The embodiment of the demodulator 66 described above is limited to an Ethernet speed of 10 Mpbs because of the use of an MC13155D FM detector circuit and carrier frequencies of 250 MHz and 350 MHz. The bandwidth of the demodulator 66 can be increased to an Ethernet speed of 100 Mbps by using an FM detector circuit 82 capable of operating at a frequency band greater than 200 MHz and also using carrier frequencies greater than 1 GHz.

Figure 10:
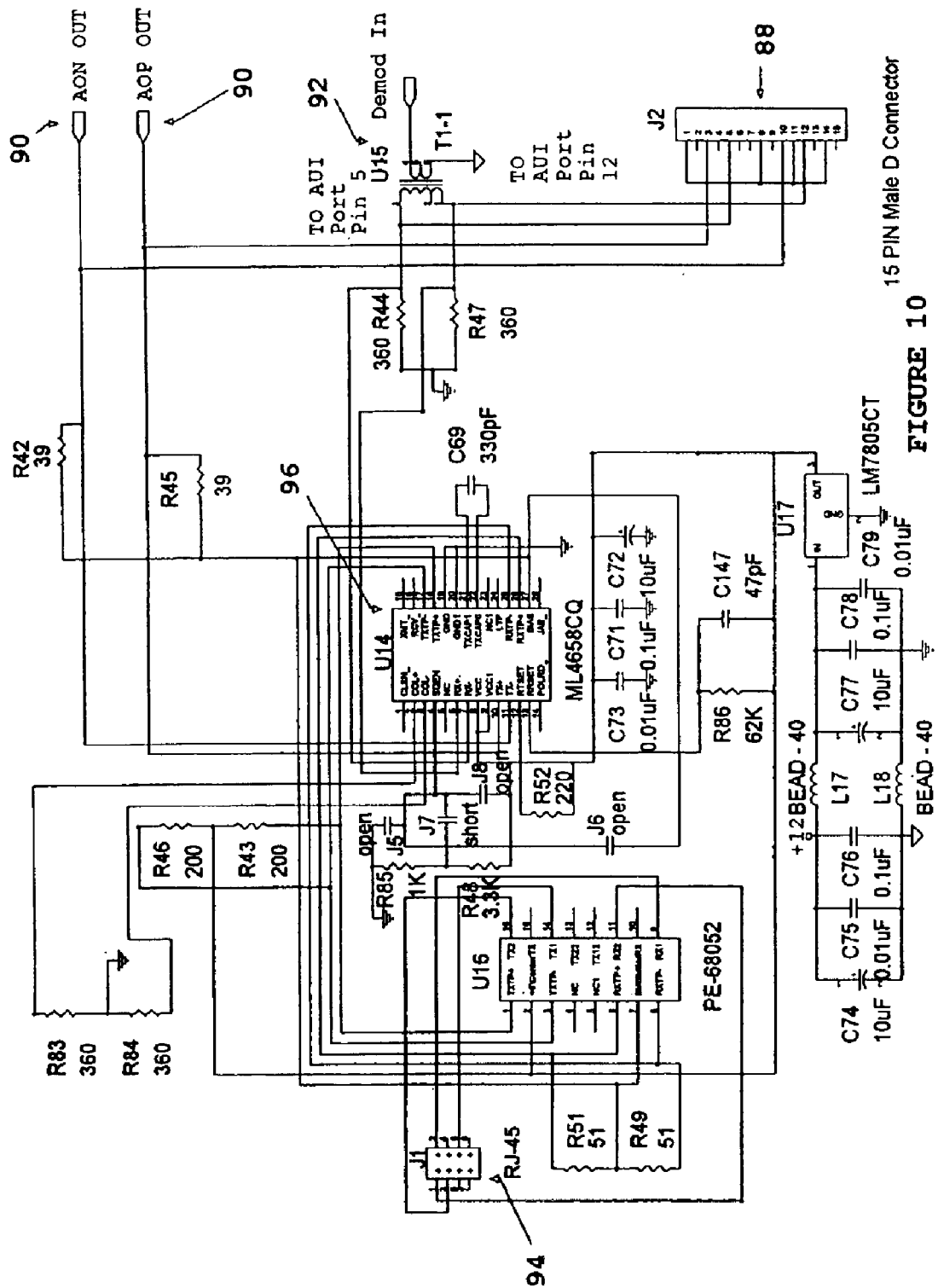
FIG. 10 is a schematic diagram of an Ethernet interface for use in the power line communications apparatus of FIG. 5.

Turning to FIG. 10, the details for the Ethernet interface 68 for both the Master and Slave units are shown. Two alternative interfaces are embodied in the Ethernet interface 68. First, an AUI interface is provided to an Ethernet HUB or switch through connector 88. Two lines 90 run from the connector 88 directly to the modulator 64, and the output of the demodulator 66 is coupled to the connector 88 using RF transformer 92. Alternatively, the communications apparatus 10 can connect to an Ethernet HUB or switch using a twisted-pair Ethernet RJ-45 connector 94. When RJ-45 connector 94 is used, integrated circuit 96, which is a 10 Base-T transceiver or Ethernet twisted-pair/AUI Adapter, preferably a ML4658CQ, and associated circuitry as shown are used to interface the RJ-45 connector 94 with the AUI port of connector 88.

Figure 11:
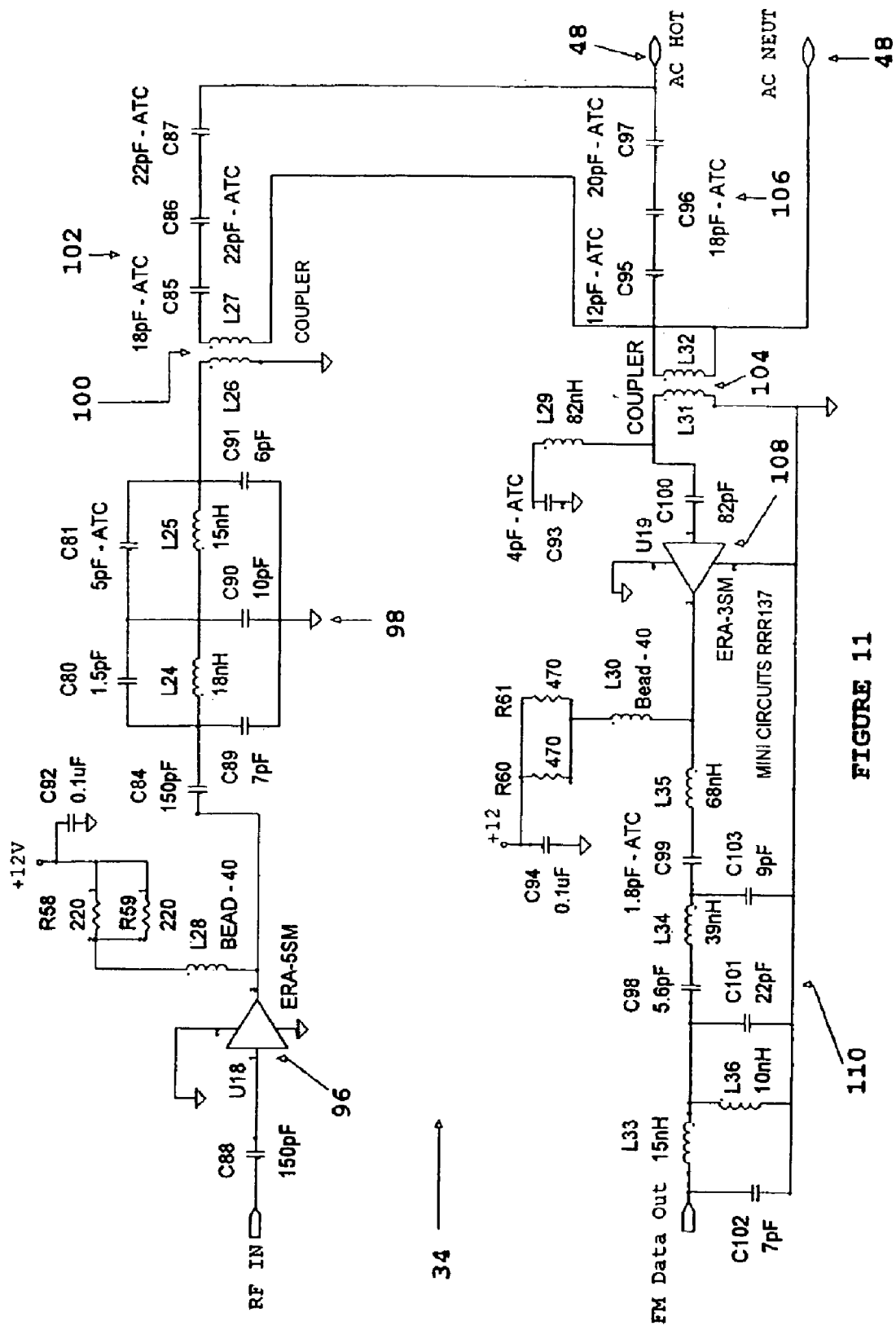
FIG. 11 is a schematic diagram of a coupler for use in the power line communications apparatus of FIG. 5 at a first set of frequencies.

Referring to FIG. 11, the coupler 34 for use in the Master communications apparatus 10 is shown. For transmission to the power lines 48, the output of the modulator 64 is first passed through RF amplifier 96 and low pass filter 98. The signal is then sent to a high frequency air-core or dielectric-core coupler of the present invention comprising air-core or dielectric-core transformer 100 and coupling capacitor (Ceq) 102. The transformer 100 and coupling capacitor 102 couple the signal to the power lines 48. The LC values in the low pass filter 98 are chosen based on the carrier frequency. The capacitor values of the coupling capacitor (Ceq) 102 are chosen to provide a 50 ohms impedance match between the power lines 48 and the RF amplifier 96.

For reception of signals from the power lines 48, a high frequency air-core or dielectric-core coupler of the present invention comprising air-core or dielectric-core transformer 104 and coupling capacitor (Ceq) 106 first couples the input signal from the power lines 48. The input signal is then sent through an RF amplifier 108 and Blinch filter 110 for output to the demodulator 66. As on the transmission side, the LC values in the Blinch filter 110 are chosen based on the carrier frequency. The capacitor values of the coupling capacitor (Ceq) 106 are chosen to provide a 50 ohms impedance match between the power lines 48 and the RF amplifier 108.

Figure 12:
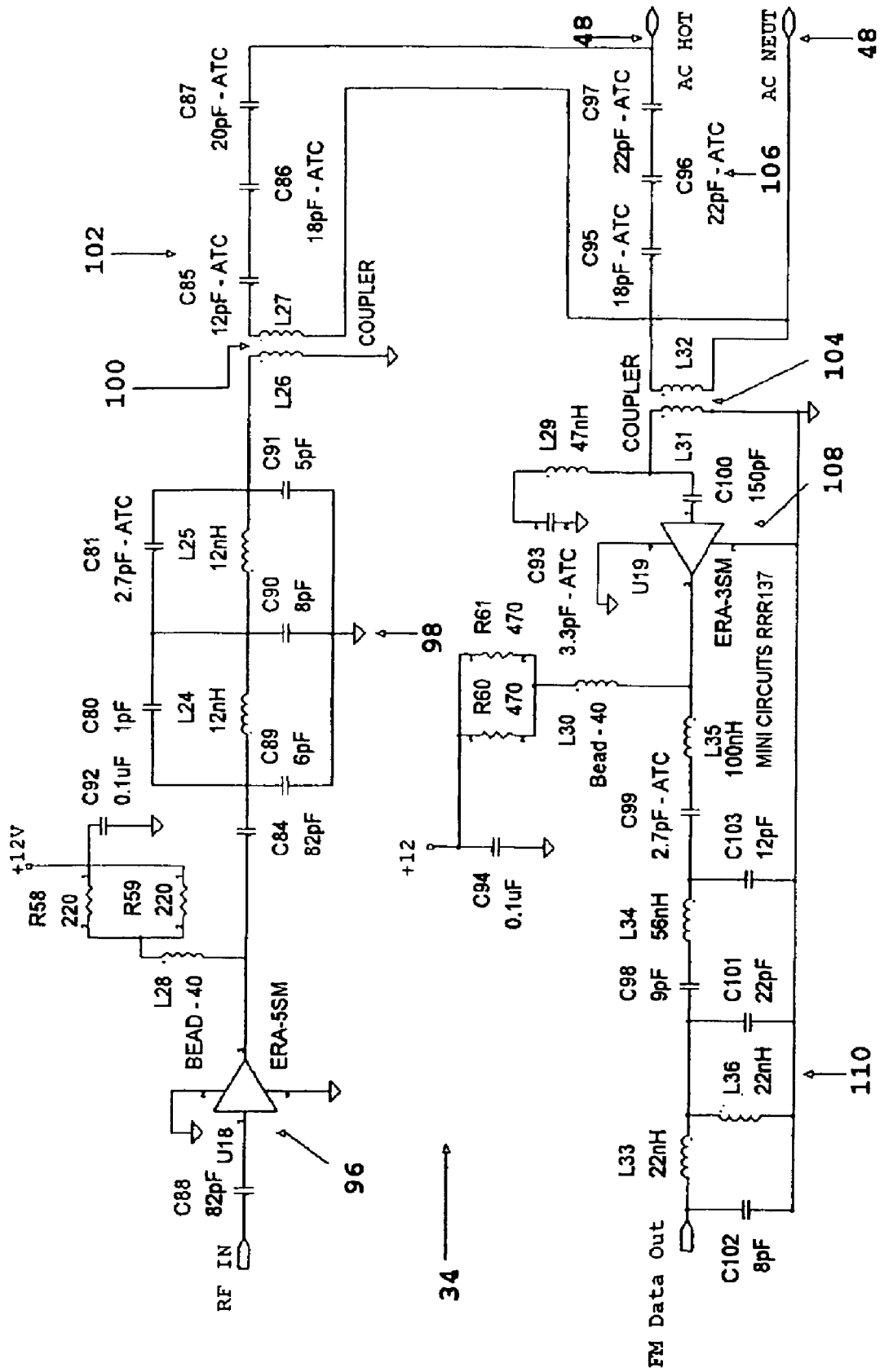
FIG. 12 is a schematic diagram of a coupler for use in the power line communications apparatus of FIG. 5 at a second set of frequencies.

FIG. 12 shows the coupler 34 for the Slave communications apparatus 10. The Slave coupler 34 is identical to the Master coupler 34 except for the values of the inductors and capacitors in Blinch filter 110 and low pass filter 98 as well as the capacitor values of the coupling capacitors (Ceq) 102, 106. The values of the these inductors and capacitors in the Slave coupler 34 are different because the carrier frequencies for transmission and reception of signals from the power lines 48 are reversed from the Master communications apparatus 10.

Figure 13:
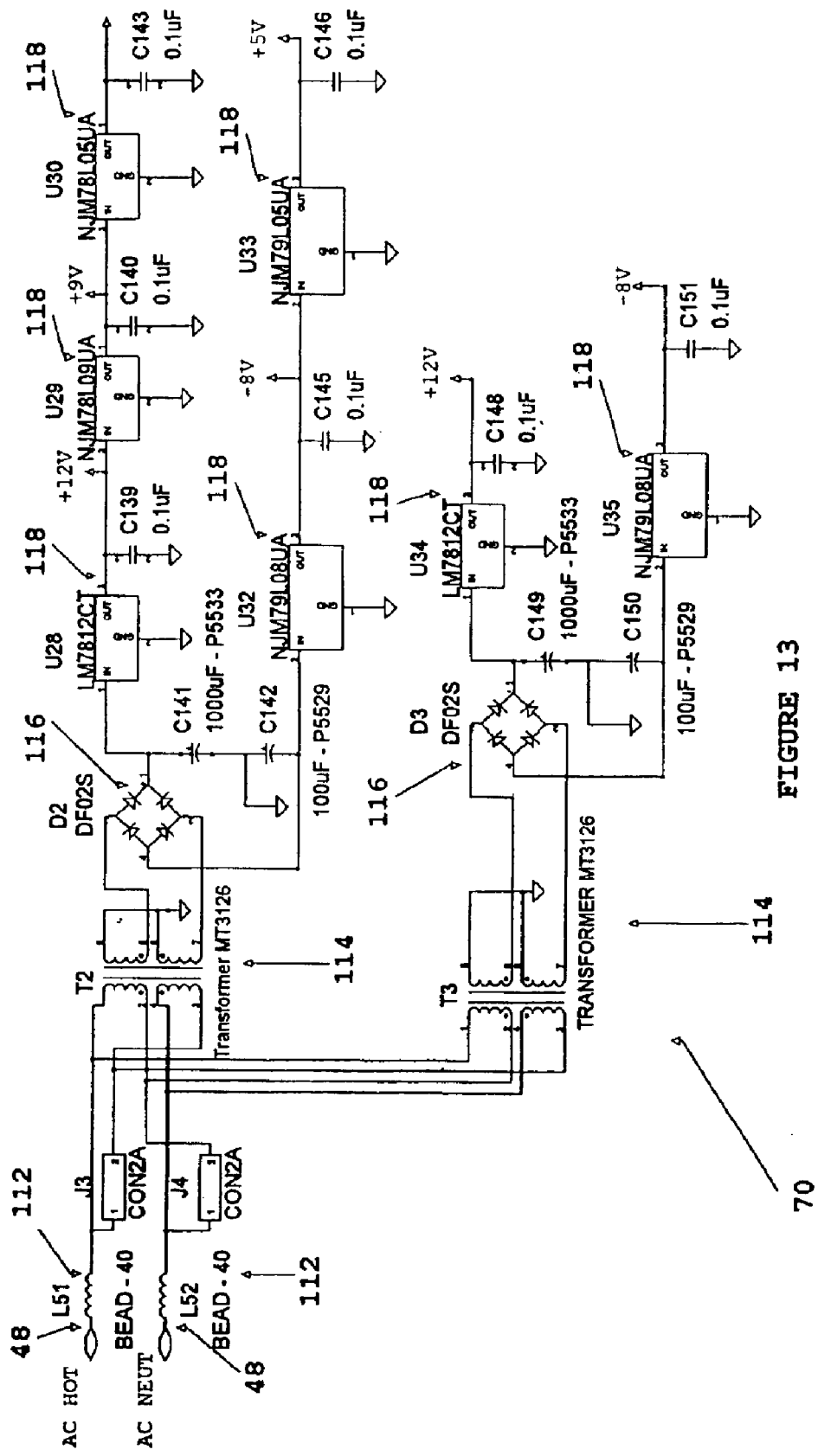
FIG. 13 is a schematic diagram of a power supply for use in the power line communications apparatus of FIG. 5.

Finally, FIG. 13 shows the power supply 70 for use with the communications apparatus 10. AC power is taken from the power lines 48 and passed through beads 112 in order to isolate the impedance of the power transformers 114 from the impedance of the power lines 48. This is done in order to provide a more stable bandwidth over the power lines and a bigger signal level. DC power is produced using power transformers 114 and rectifiers 116. Finally, DC outputs of different voltages needed in the communications apparatus 10 are produced using voltage regulators 118. As seen in FIG. 13, separate power transformers 114, rectifiers 116 and voltage regulators 118 are used to provide power for the transmission side and the reception side of the communications apparatus 10. In this manner, the 250 MHz and 350 MHz carrier frequencies are isolated from one another.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A communications apparatus for communicating multiplexed electric signals through one or more electric lines having a characteristic impedance, comprising:

a plurality of modulators to modulate the electric signals to produce multiple modulated carrier signals, each having a pre-selected frequency of about 200 MHz or greater;

one or more transmitters, each having an output impedance, operatively connected to each modulator for transmitting the modulated carrier signals;

a coupler for connection between the electric line and each transmitter, said coupler matching the output impedance of the transmitter to the characteristic impedance of the electric line and communicating modulated carrier signals to the electric line without significant phase distortion;

each coupler comprising:

a transformer having a non-magnetic core; and a coupling capacitor that resonates with the transformer at the pre-selected frequency;

said transformer comprising:

a first conductive plate; and a second conductive plate spaced from the first conductive plate by the non-magnetic core;

the capacitor being adapted to be connected between the first conductive plate and the electric line, wherein the impedance of the first conductive plate and the capacitor are matched to the characteristic impedance of the electric line at a pre-selected bandwidth; and a frequency division multiplexer for combining the electric signals.

2. A communications apparatus in accordance with claim 1 wherein said frequency division multiplexer is an orthogonal frequency division multiplexer.

3. The apparatus of claim 1 wherein the multiplexed signals are communicated using an Ethernet protocol.

4. A communications apparatus for communicating multiplexed electric signals through one or more electric lines having a characteristic impedance, comprising:

a plurality of modulators to modulate the electric signals to produce multiple modulated carrier signals having a pre-selected frequency of about 200 MHz or greater;

one or more transmitters, each having an output impedance, operatively connected to each modulator for transmitting the modulated carrier signals;

a coupler for connection between the electric line and each transmitter, said coupler matching the output impedance of the transmitter to the characteristic impedance of the electric line and communicating modulated carrier signals to the electric line without significant phase distortion;

each coupler comprising:

a transformer having a non-magnetic core; and a coupling capacitor that resonates with the transformer at the pre-selected frequency;

said transformer comprising:

a first conductive plate; and a second conductive plate spaced from the first conductive plate by the non-magnetic core;

the capacitor being adapted to be connected between the first conductive plate and the electric line, wherein the impedance of the first conductive plate and the capacitor are matched to the characteristic impedance of the electric line at a pre-selected bandwidth; and a multiplexer for combining the electric signals.

5. The apparatus of claim 4 wherein the multiplexed signals are communicated using an Ethernet protocol.

6. A communications apparatus for communicating electric signals at about 100 Mbps or more through one or more electric power lines having a characteristic impedance:

a plurality of modulators for modulating the electric signals to produce multiple modulated carrier signals having a pre-selected frequency equal to or greater than 200 MHz;

a transmitter operatively connected to the modulators and having an output impedance, said transmitter transmitting the modulated carrier signals;

a coupler connected between the electric line and the transmitter, said coupler matching the output impedance of the transmitter to the characteristic impedance of the power line and communicating the modulated carrier signals to the power line without significant phase distortion;

said coupler comprising:

a transformer having a non-magnetic core; and a coupling capacitor that resonates with the transformer at the pre-selected frequency;

said transformer comprising:

a first conductive plate; and a second conductive plate spaced apart from the first conductive plate by the non-magnetic core;

a capacitor adapted to be connected between the first conductive plate and the power line, the impedance of the first conductive plate and the capacitor being matched to the characteristic impedance of the power line at a pre-selected bandwidth.

7. A communications apparatus in accordance with claim 6 wherein the modulated carrier signals are at about 1 Gbps or more.

8. The apparatus of claim 6 wherein the multiplexed signals are communicated using an Ethernet Networking protocol.

9. A method for communicating electric signals over an electric power distribution system including distribution transformers, the distribution system having a characteristic impedance at the input terminal for the electric signals, said method comprising:

using a plurality of modulators to modulate the electric signals to produce multiple modulated carrier signals having a frequency equal to or greater than 200 MHz;

transmitting the modulated carrier signals through a transmitter having an output impedance;

coupling the modulated carrier signals to the electrical power system without significant phase distortion using a coupler that matches the output impedance of the transmitter to the characteristic impedance of the system at the place where the coupling is made;

said coupler comprising a transformer having a non-magnetic core and a coupling capacitor, said coupler communicating the modulated carrier signals to the power system without significant phase distortion; and said coupling capacitor resonating with the transformer at the modulated carrier frequencies;

the first conductive plate; and a second conductive plate spaced from the first conductive plate by the non-magnetic core;

said coupling capacitor being connected between the first conductive plate and the power system, wherein the first conductive plate and the capacitor are matched to the characteristic impedance of the power system at a pre-selected bandwidth; and wherein the electric signal includes data transmitted at a speed of about 100 Mbps or greater.

10. A method of communicating electric signals in accordance with claim 9 wherein the power system includes low voltage, mid voltage and high voltage power lines or any combination thereof.

11. A method for communicating electric signals over one or more electric lines having a characteristic impedance, comprising:

using a plurality of modulators to modulate the electric signals to produce multiple modulated carrier signals having a pre-selected frequency equal to or greater than 200 Mhz;

transmitting the modulated carrier signals using a transmitter having an output impedance;

coupling the modulated carrier signals to the electric line without significant phase distortion using a coupler that matches the output impedance of the transmitter to the characteristic impedance of the electric line;

said coupler comprising:

a transformer having a non-magnetic core, said transformer communicating the modulated carrier signal to the electric line without significant phase distortion; and a coupling capacitor that resonates with the transformer at the pre-selected frequency;

said transformer comprising:

a first conductive plate;

a second conductive plate spaced from the first conductive plate by the non-magnetic core; and said coupling capacitor being connected between the first conductive plate and the electric line, wherein the conductive plate and the capacitor are matched to the characteristic impedance of the electric line at a pre-selected bandwidth;

wherein the secondary winding of said transformer is operatively connected to the transmitter at a matching impedance of about 40 to 50 ohms substantially without regard to changes in the impedance of the electric line, and the primary of the transformer is impedance matched to the electric line in a range from about 1 to 500 ohms.

12. A system for distributing high speed information signals, such as digital video, digital voice, or digital data signals, over a power line distribution system including transformers from a remote location to a pre-determined location, comprising the steps of:

coupling the high speed information signals into a mid-voltage section of the distribution system at a rate of about 10 Mbps to about 1 Gbps;

distributing the high speed information signals over the power lines within the system including distribution transformers to a pre-determined location;

coupling the high speed information signals from a low voltage section of the distribution system, near the pre-determined location, into a modem for insertion into a local area network (LAN) at the pre-determined location at a speed of about 10 Mbps to 100 Mbps;

each said coupler comprising a transformer having a non-magnetic core for coupling the high speed information signals without significant phase distortion;

said transformer comprising:

a first conductive plate;

a second conductive plate spaced apart from the first conductive plate by the non-magnetic core; and a coupling capacitor connected between the first conductive plate and the electric power line, wherein the first conductive plate and the capacitor are matched to the characteristic impedance of the electric power line.

13. A method for communicating electric signals over an electric power distribution system at about 100 Mbps or greater, said method comprising:

using a plurality of modulators to produce multiple modulated carrier signals;

transmitting the modulated carrier signals through a transmitter having an output impedance;

coupling the modulated carrier signals to the electric power system without significant phase distortion using a coupler that matches the output impedance of the transmitter to the characteristic impedance of the system at the place where the coupling is made;

said coupler comprising a transformer having a non-magnetic core and a coupling capacitor, said coupler communicating the modulated carrier signals to the power system without significant phase distortion.

14. The method of claim 13 wherein the transformer comprises:

a first conductive plate;

a second conductive plate spaced from the first conductive plate by a non-magnetic core; and said coupling capacitor being connected between the first conductive plate and the electric line, wherein the conductive plate and the capacitor are matched to the characteristic impedance of the electric line at the location where the coupler is connected to the electric line.

15. The apparatus of claim 13 wherein the electric signals are communicated over the electric power distribution system using an Ethernet Networking protocol.

16. A method for communicating electric signals over an electric power distribution system at about 100 Mbps or greater, said method comprising:

in a power line modem/networking system connected to the backbone of the entire Networking System for cable TV, telephone, internet, security and other control applications being transmitted at very high speed data with digitally signal processed carrier signals over the distribution power line and directly through the distribution transformers from the mid to the low voltage power line and back;

producing multiple modulated carrier signals, thereby creating a Frequency Division Multiplexing or Orthogonal Frequency Division Multiplexing over the power line;

transmitting the modulated carrier signals through a transmitter having an output impedance;

coupling the modulated carrier signals to the electric power system without significant phase distortion using a coupler that matches the output impedance of the transmitter to the characteristic impedance of the system at the place where the coupling is made and matches the power line characteristic impedance;

said coupler comprising a transformer having a non-magnetic core and a coupling capacitor, said coupler communicating the modulated carrier signals to the power system without significant phase distortion.

17. The method of claim 16 wherein the electric signals are communicated over the electric power distribution system using an Ethernet Networking protocol.

18. A method for communicating electric signals over an electric power line at about 100 Mbps or greater, said method comprising:

in a power line modem/networking system being adapted to network very high speed data over the power line with digitally signal processed carrier signals for cable TV, telephone, internet, security and other control applications;

producing multiple modulated carrier signals creating a Frequency Division Multiplexing or Orthogonal Frequency Division Multiplexing over the power line;

transmitting the modulated carrier signals through a transmitter having an output impedance;

coupling the modulated carrier signals to the electric power system without significant phase distortion using a coupler that matches the output impedance of the transmitter to the characteristic impedance of the system at the place where the coupling is made and matches the power line characteristic impedance;

said coupler comprising a transformer having a non-magnetic core and a coupling capacitor, said coupler communicating the modulated carrier signals to the power system without significant phase distortion.

19. The method of claim 18 wherein the electric signals are communicated over the power line using an Ethernet Networking protocol.

* * * * *